April 22, 1969 E. O. BLODGETT 3,439,852

BIDIRECTIONAL TAPE DRIVE MECHANISM

Filed July 19, 1967 Sheet 1 of 4

INVENTOR.
EDWIN O. BLODGETT

BY George W. Killian

AGENT

United States Patent Office 3,439,852

Patented Apr. 22, 1969

3,439,852

BIDIRECTIONAL TAPE DRIVE MECHANISM

Edwin O. Blodgett, Rochester, N.Y., assignor to Friden, Inc., a corporation of Delaware Filed July 19, 1967, Ser. No. 654,589
Int. Cl. G03b *1/24;* B65h *25/00;* F16h *29/00*
U.S. Cl. 226—51 10 Claims

ABSTRACT OF THE DISCLOSURE

A tape drive mechanism having a tape drive pin wheel and associated guides and tension means for selectively transporting a tape in either longitudinal direction. The embodiment, as disclosed, provides a tape drive mechanism adapted to drive a punched tape in either longitudinal direction for reading the tape as it passes in one direction through the reading zone, and for driving the tape in the opposite direction if rereading of any portion thereof is required.

The tape is guided to opposite sides of a pin wheel and a tape guide frame by means of a pair of idler rollers, and tape hold-down roller assemblies. A tape tension finger senses the presence of a tape in the reader and controls a tape run-out switch which is closed whenever tape is being processed, while the tape hold-down assemblies maintain a tape hold-down switch closed while the mechanism is operating.

The tape drive shaft, which has the tape driving pin wheel at one of its ends, is journalled for bidirectional rotation and it has fixed thereto a pair of tape feed ratchets which are spaced along the axis of the shaft. A rotatably driven cam shaft is arranged in parallel relation to the tape feed shaft and has fixed thereto a pair of spaced feed cams in vertical alignment, respectively, with the ratchets to form ratchet and cam pairs. Similar two-armed feed levers are mounted for rocking movement by each of the cams. One of the feed levers has pivoted to one of its arms a pawl adapted to drive one of the ratchets in one rotational direction, while the corresponding arm of the other feed lever has pivoted thereto a feed pawl adapted to drive the other ratchet in the opposite rotational direction.

The drive levers may be selectively disabled to control rotation of the tape driving pin wheel in one direction or the other. This is done by resort to an electromagnetic latch in operative relation to the second arm of each lever. Each latch provides a spring-biased, pivoted armature which is interposed into blocking position to its related lever arm when the electromagnet is deenergized.

Each ratchet pawl has operatively associated with it an adjustable feed pawl rest block which guides and holds the end of its pawl out of contact with its ratchet wheel to permit drive by the other pawl and ratchet wheel. An adjustable feed pawl stop is also operatively associated with each feed pawl to prevent over-travel or over-drive of the pin wheel.

This invention relates to the art of bidirectionally feeding web or tape-like material. The mechanism in its specific aspects was conceived as a punched data tape feeding and reading device providing means for feeding a record tape over a tape reading zone in step-by-step progression, and in particular providing a mechanism to so feed a tape in either a forward or a reverse direction at the option of the operator, or in response to electrical command signals.

Data read from a tape at one location is sometimes transmitted by wire or other appropriate means to a remote location where the data may be processed or otherwise treated. The accuracy of data transmission in such systems is usually checked by a parity check or an equivalent operation, and if an error in transmission is detected, the sending location is requested to retransmit the block of data in which the transmission error was detected. In the latter case, the record tape is reversed in the tape reader at the sending location, without data transmittal, until the beginning of the data block containing the transmission error is reached, at which point the direction of tape movement is again reversed and the data block is retransmitted.

Bidirectional record tape feeding mechanisms are well known. One example of a mechanism for selectively feeding a record tape in intermittent progression in either the forward or reverse direction in reference to punched tape is disclosed in Drillick United States Patent 3,292,922, dated Dec. 20, 1966. The bidirectional feed of magnetic tape was disclosed at an earlier date in Weidenhammer et al. United States Patent 3,057,568. A substantial difference exists between punched tape drives and magnetic tape drives. The former almost invariably include a pin wheel for driving the tape in character-by-character progression over a series of tape reading elements. In the latter drives, a magnetically recorded tape is usually driven in continuous progression over a reading head by means of tape driving capstans which frictionally engage the tape. The present invention is distinguished from these prior devices in its provision in a punched tape reader of very simple dual pawl and ratchet mechanism, either of which may be selectively activated to feed the punched tape either in a forward or a reverse direction.

The mechanism includes a tape feed shaft having a tape driving pin wheel thereon for driving engagement with a punched tape. The shaft is journalled for bidirectional rotation and has attached thereto a pair of tape feed ratchets. A rotatably driven cam shaft parallel to the feed shaft has a pair of feed cams mounted thereon to form paired cam-ratchet assemblies. A pair of similar two-armed feed levers each having a pawl adapted to operate its associated ratchet, one in one direction and the other in the opposite direction, are mounted for rocking motion by the respective cams. Associated with each of the feed levers is an electromagnetic latch device for selectively disabling either or both of the feed levers from operation. Additional mechanism includes adjustable feed pawl stops and feed pawl rest blocks for each of the pawls.

The foregoing structures, the purpose of the invention, and its advantages will be more fully understood by reference to the drawings which illustrate a presently preferred embodiment, when viewed in light of the detailed description to follow. In the drawings, like reference numerals indicate like parts, and:

Figure 1:
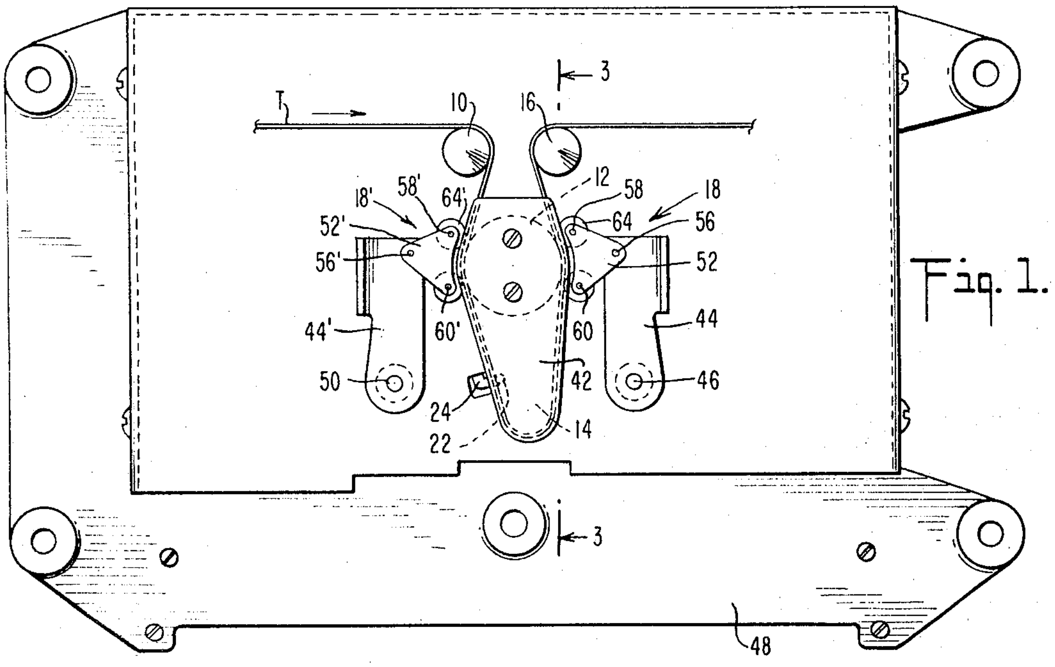
FIG. 1 is a facial elevation of a tape reader in which the present improvements have been embodied.

The ultimate purpose of the present invention can be explained in reference to FIG. 1. In this figure, a punched tape T, assumed for the purpose of this description to be moving from left to right in the direction of the arrow, is brought about a tape guide idler roller 10 and downwardly into contact with a pin wheel 12 which is the instrument by which the tape is driven through the tape reading station. Below the pin wheel 12 is a photocell block 14 about which the tape turns as it is being read. The tape now moves upwardly where it is again engaged by the pin wheel 12 and passes about a second tape guide idler roller 16 from whence the tape may be returned to a storage reel if it is to be preserved. The tape is held against the pin wheel 12 by means of tape hold-down roller assemblies 18 and 18'. Sensing the presence of the tape in the course described is a tape tension finger 22 which projects laterally from a pivoted tape tension arm 24.

Figure 2:
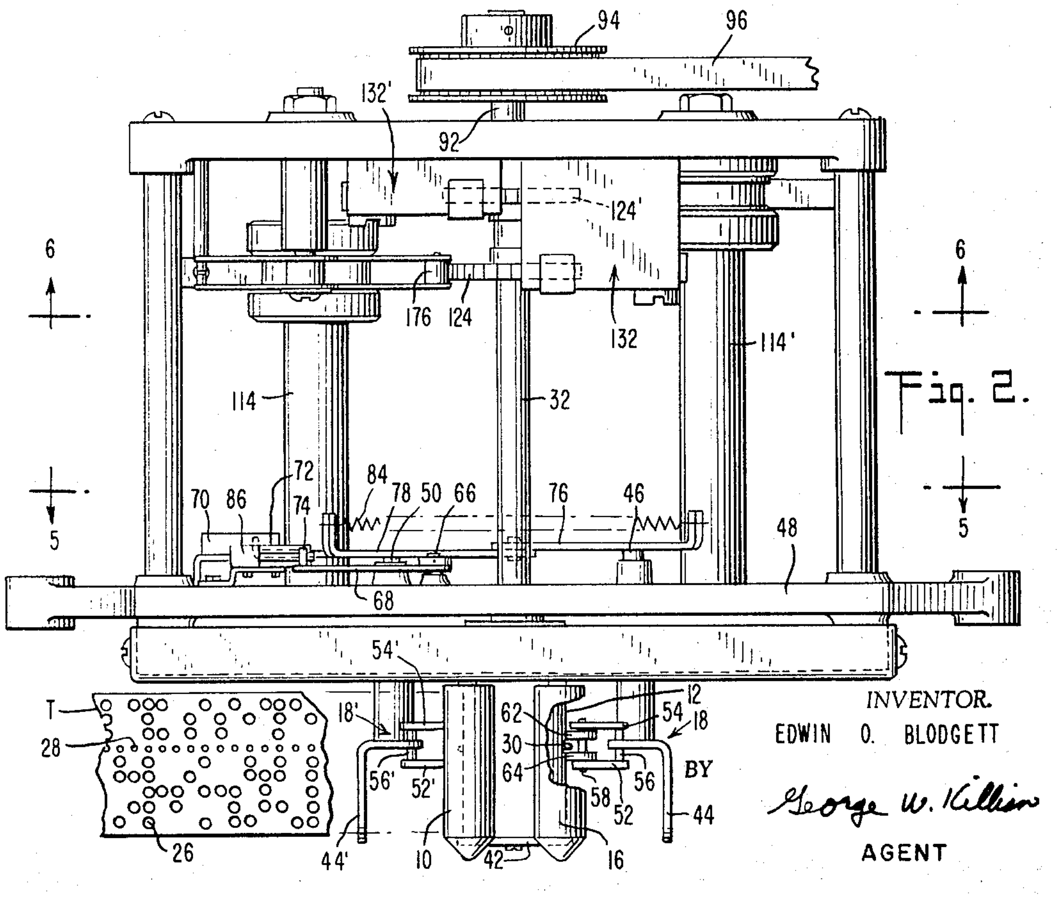
FIG. 2 is a plan view of the reader.

By reference to FIG. 2, it can be seen that the mechanism herein is illustrated in connection with a tape reader adapted to operate on a punched tape T having an arbitrarily selected capacity for 8 coded holes 26 to form each character punched across the width of the tape. It is also useful to note that a row of tape feed holes 28 extends along the length of the tape between the third and fourth code hole positions. It is these feed holes that are engaged by the pins projecting from the pin wheel 12 to drive the tape during rotation of the pin wheel.

Figures 3, 4:
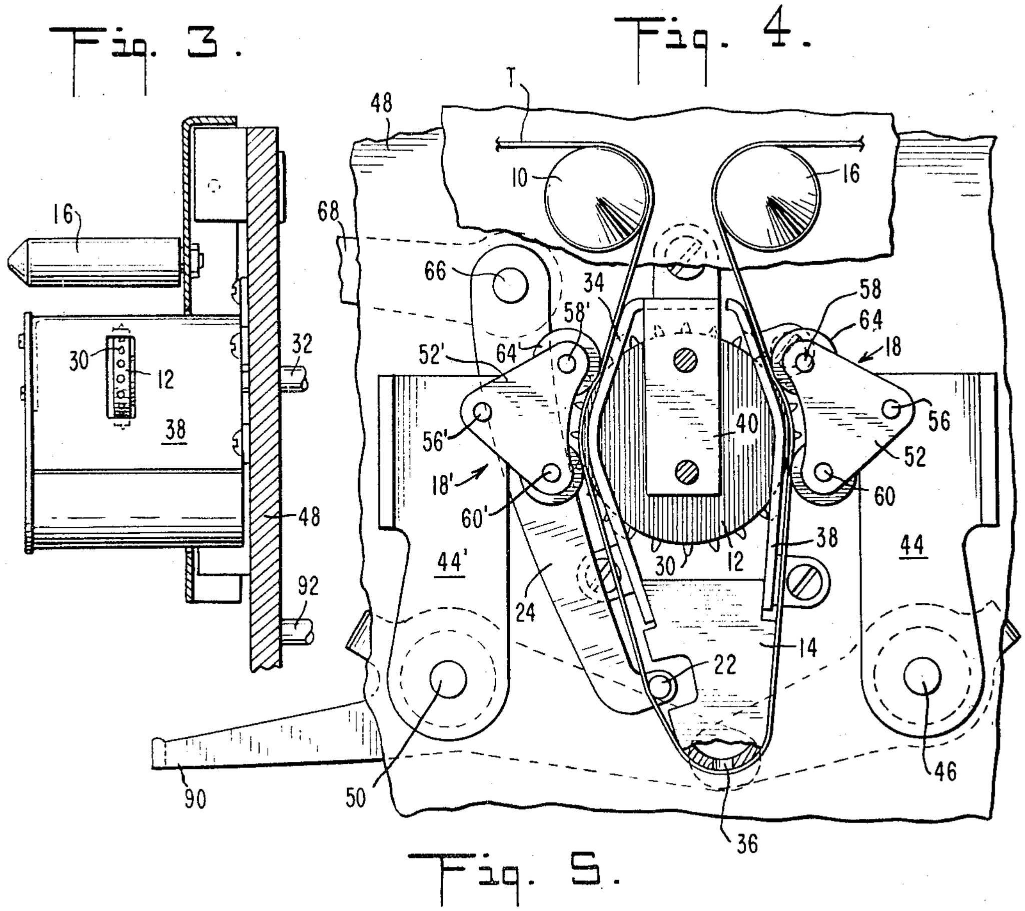
FIG. 3 is a view of a tape drive and guide mechanism on line 3—3 of FIG. 1.
FIG. 4 is an enlarged view of the tape guide and tape drive mechanism at the reading station.

Reference to FIG. 4 will more clearly show the details of the tape feeding mechanism of FIG. 1 which has been described so briefly. In FIG. 4, it will be seen that the pin wheel 12 has a plurality of tape feed hole-engaging pins 30 extending radially from its peripheral surface. The pin wheel 12, as stated, is mounted on the end of a pin wheel shaft 32 (FIGS. 2 and 3). As the tape descends from the tape guide idler roller 10 (FIG. 4), it is guided by a stripper plate 34 which is outwardly curved and centrally slotted to expose the pins 30. The photocell block 14 houses photoelectric cells which read the holes in the tape as the tape passes about the photocell block. This block has aligned apertures 36 corresponding in number and position to the code holes of each successive character punched into the tape. On its return beyond the photocell block 14, the tape is guided in contact with a second stripper plate 38 which is also outwardly curved and centrally slotted to expose the pin wheel teeth 30. The tape now passes about the second tape guide idler roller 16. The stripper plate 34 has a downwardly extending flange 40 with a pair of screw holes therein for supporting a cover plate 42 (FIGS. 1 and 4).

The tape hold-down roller assemblies 18 and 18' (FIG. 4) are identical in structure and can best be explained by reference to the assembly 18, more fully shown in FIG. 2. The assembly 18, for example, includes a tape hold-down arm 44 which, at its lower end, is attached to a shaft 46 (FIGS. 1 and 5) extending through and to the rear of the frame plate 48. The roller assembly 18' is similarly attached to a shaft 50 which also extends through and to the rear face of the frame plate 48. Both shafts 46 and 50 are free to rock about their axes. Attached to the upper inner edge of the tape hold-down arm 44 is a roller cage consisting of a pair of spaced, generally triangular, plates 52 and 54 (FIGS. 2 and 4). This cage is pivoted to the tape hold-down arm 44 by means of a pivot pin 56 which also serves to hold plates 52 and 54 in spaced relation to each other. The base corners of the spaced triangular plates 52 and 54 are connected, respectively, by pins 58 and 60 (FIG. 4). These pins support pairs of spaced rollers identical to those shown in FIG. 2 in respect to the pin 58. In the latter figure, an inner roller 62 and an outer roller 64 are arranged at opposite sides of the pins 30 thereby assuring that the tape is accurately and firmly held in contact with the pin wheel 12. The tape hold-down assembly 18' is identical to that of the assembly 18 with the exception that its position is reversed at the opposite side of the pin wheel 12. Corresponding elements of the assembly 18' are identified by the same reference numerals as applied to assembly 18, excepting, however, that the latter numerals will have added thereto a prime.

FIG. 4 illustrates the position and the detail structure of the tape tension finger 22 and the tape tension arm 24. Here it is shown that the tape tension finger 22 is mounted at the free end of the tape tension arm 24 and that it normally rests against the inner face of the tape. The tape tension arm 24 extends upwardly where it is attached to a tape tension arm shaft 66 which extends through the frame plate 48. At the opposite face of the plate 48, the shaft 66 (FIG. 5) has fixed thereto a tape run-out switch actuator arm 68. The tape tension arm shaft 66 is free to rock in the frame plate 48 whereby any movement of the tape tension arm 24, as by absence of tape caused by tape breakage, for example, will be transmitted to the tape run-out switch actuator arm 68 and permit the switch to open. The tape tension arm is spring biased outwardly whereby it is able to perform its secondary function of holding the tape securely in contact with the photocell block 14.

Figure 5:
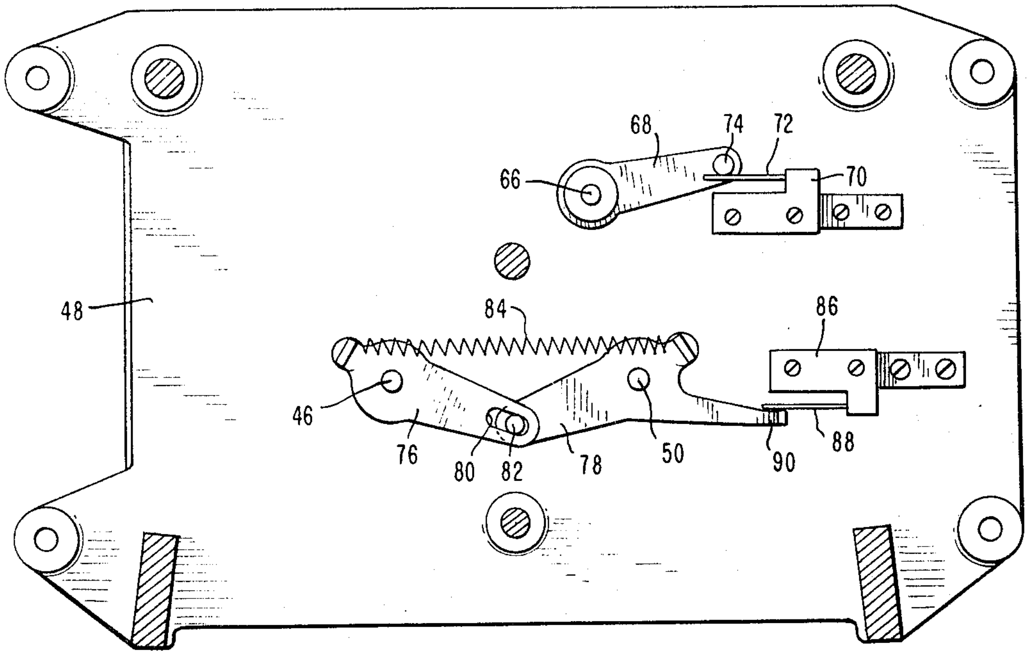
FIG. 5 is a view partly in section on line 5—5 of FIG. 2.

Continued reference to FIG. 5 will make clear the location of the tape tension arm shaft 66, the tape run-out switch actuator arm 68, and an associated tape run-out switch 70 at the inner face of the frame plate 48. The tape run-out switch 70 has an operating tongue 72 in the path of a pin 74 extending laterally from the tape run-out switch actuator arm 68. The tape run-out switch 70 is required to be closed when tape is in the reader, and when so conditioned, it supplies a degree of tension to the tape tension arm 24 tending to hold its tape tension finger 22 in contact with the tape. Should the tape be broken, the tape tension arm 24 will rock its tape tension arm shaft 66 in a counterclockwise direction, as viewed in FIG. 5, and permit the tape run-out switch 72 to open.

As also seen in FIG. 5, the tape hold-down arm shafts 46 and 50 have attached thereto fingers 76 and 78, respectively. These fingers are attached to their respective shafts for rotation therewith, whereby the position of the tape hold-down roller assemblies 18 and 18' are reflected. The free end of the finger 76 has an oblong slot 80 formed therein which is adapted to receive a pin 82 projecting laterally from the finger 78. Each of the fingers 76 and 78 has a lug formed therein outwardly of their shafts 46 and 50. These lugs respectively receive an end of a spring 84. The spring 84 effectively constitutes, with the fingers 76 and 78, an over-center toggle device. Thus, when the fingers are disposed as shown in FIG. 5, the spring 84 will tend to hold the fingers in this over-center position with the result that the tape hold-down roller assemblies 18 and 18' are yieldingly urged in the direction of the pin wheel 12. By the same token, when the tape hold-down roller assemblies 18 and 18' are manually swung away from the pin wheel 12, as in the case of threading tape into the tape drive and reading mechanism, the fingers 76 and 78 by reason of the slot 80 and pin 82 connection thereof, will move over-center in the opposite direction and will be held in that position by the spring 84.

Attached to the rear face of the frame plate 48 is a tape hold-down switch 86 having an operating tongue 88. The tape hold-down switch 86 is required to be closed when tape is in the reader and such closure is effected by an extension 90 of the finger 78 which lies in switch-closing relation to the tongue 88 when the tape hold-down roller assemblies are in normal operative position.

It is an object of this invention, as stated, to selectively drive the pin wheel 12 in either direction at the operator's option, or in response to an electrical command signal from another unit of equipment, for example, to thereby drive the tape through the reading station in either direction, i.e., from left to right, as shown by arrow in FIG. 1, or from right to left. The invention concerns itself in particular with the mechanism by which the pin wheel may be selectively operated, either in a clockwise or a counter-clockwise direction.

Figure 6:
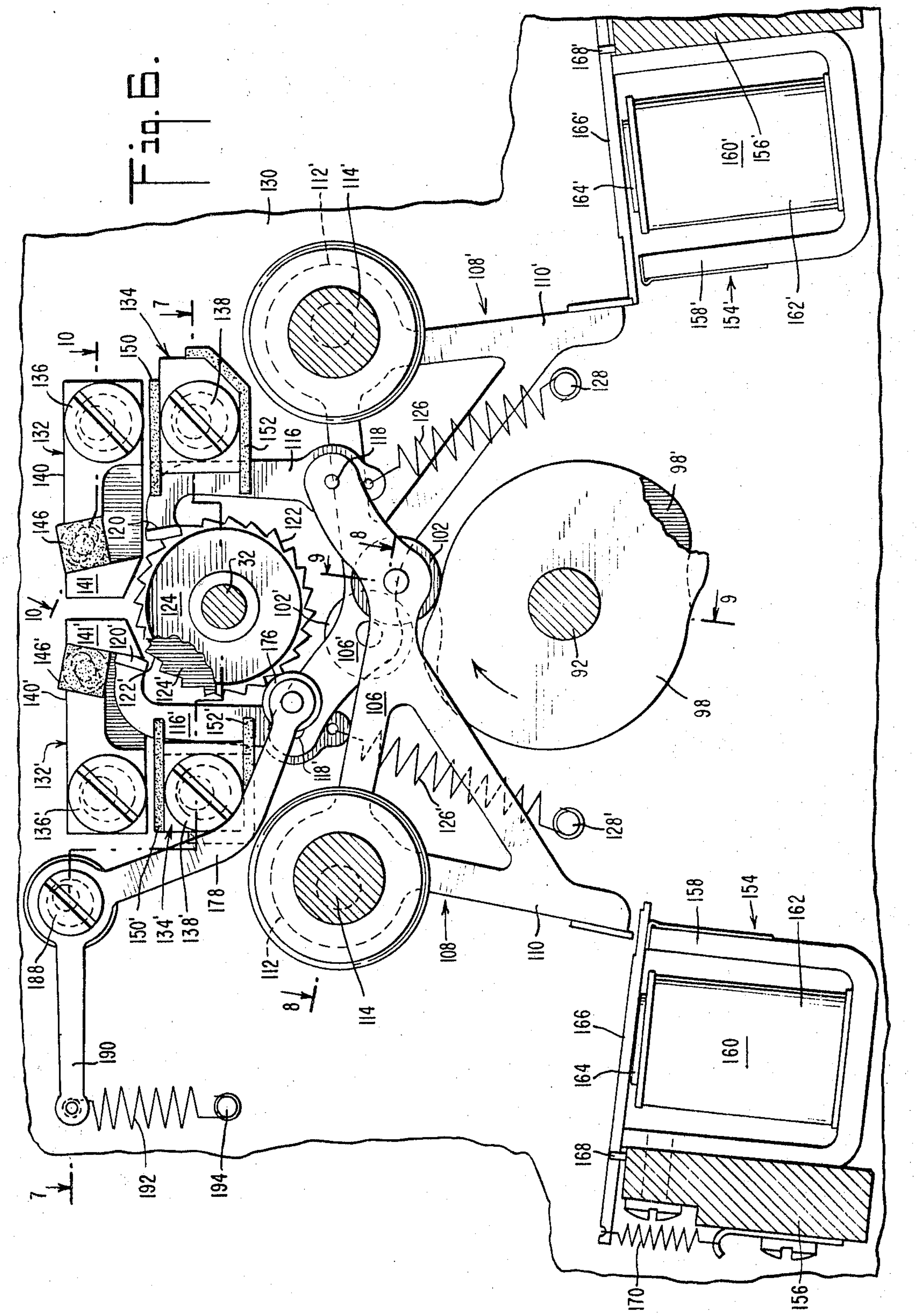
FIG. 6 is a view partly in section on line 6—6 of FIG. 2.

The organization of the mechanism provided herein for selectively driving the pin wheel 12 in one direction of rotation or the other is best followed by reference to FIGS. 6 through 9, particularly, FIG. 6. A cam shaft 92 is constantly driven in a single direction through any suitable means (FIG. 2), as, for example, a drive pulley 94 and a drive belt 96. The pin wheel is rotated by a pair of selectively controlled cam driven pawl and ratchet systems which operate in the same manner through elements which are identical but oppositely disposed in respect to the ratchet shaft to produce opposite driving forces. An examination of FIG. 6 will quickly disclose the correspondence between the elements of one system with those of the other. In this figure the same reference numerals are used to indicate corresponding parts of the two systems, with the exception that the reference numerals of one of the systems are primed.

Figures 7, 8, 9, 10:
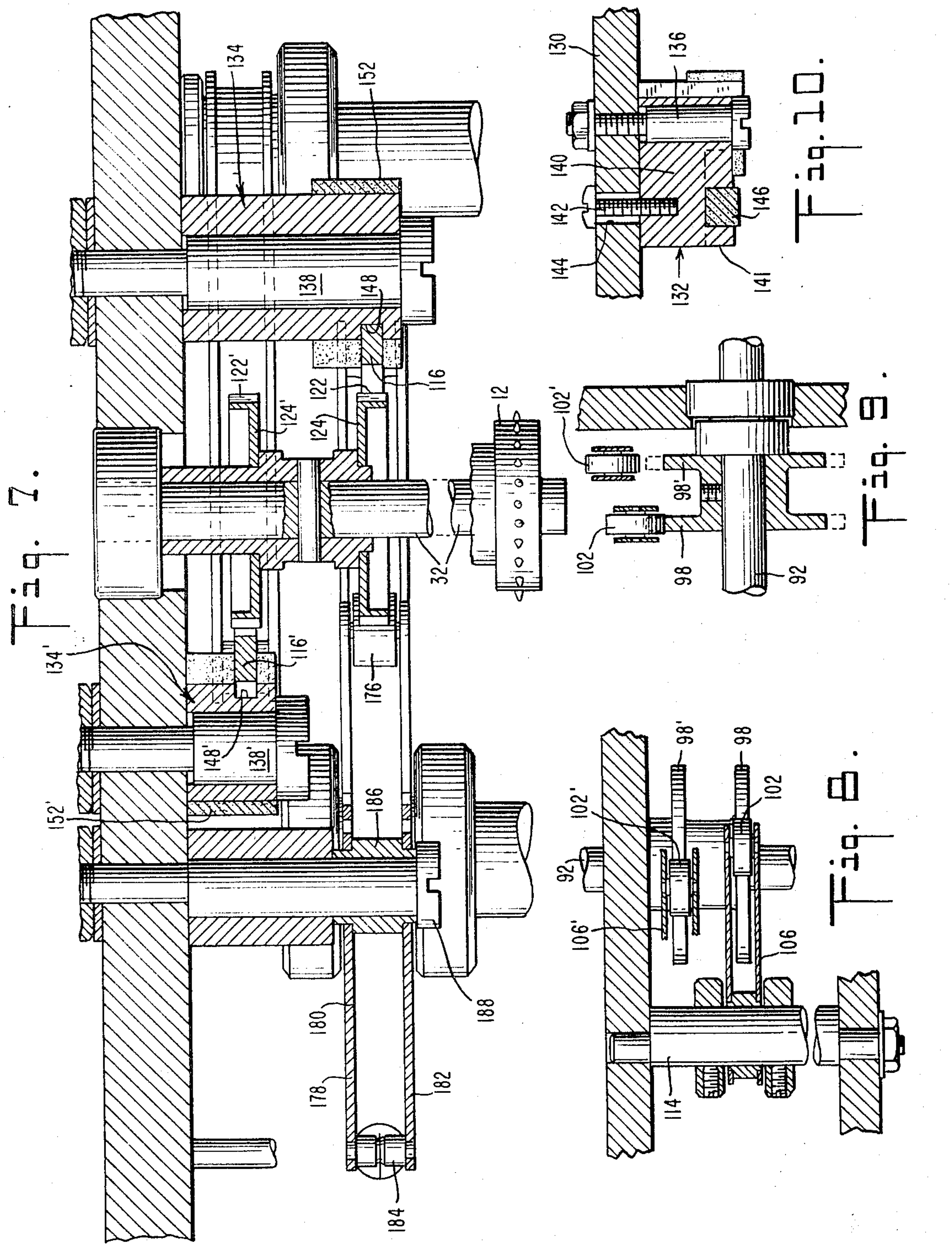
FIG. 7 is a view partly in section on line 7—7 of FIG. 6.
FIG. 8 is a fragmentary view partly in section on line 8—8 of FIG. 6.
FIG. 9 is a fragmentary view partly in section on line 9—9 of FIG. 6.
FIG. 10 is a fragmentary view partly in section on line 10—10 of FIG. 6.

Fixed to the cam shaft 92 are a pair of spaced feed cams 98 and 98′ (see FIGS. 6, 8 and 9). These cams have operating in association therewith cam followers 102 and 102′, respectively. The cam followers 102 and 102′ are respectively mounted on a bifurcated arm 106 and 106′ of respective feed levers 108 and 108′ which include also arms 110 and 110′ disposed generally at right angles to their respective arms 106 and 106′. At their intersection, these arms are joined into hubs 112 and 112′ which are mounted for rocking movement on eccentric shafts 114 and 114′ respectively. The end of the arms 106 and 106′ have connected thereto respective feed pawls 116 and 116′ by means of their respective pivot pins 118 and 118′. The feed pawls 116 and 116′ terminate in heads 120 and 120′ respectively adapted to engage the teeth 122 and 122′ of their respective ratchet wheels 124 and 124′ fixed to the pin wheel shaft 32. The eccentric shafts 114 and 114′ permit adjustment of their associated feed lever assemblies. In FIG. 6, the pawl 116 is at the bottom of its stroke after having advanced the ratchet 124 and the pawl 116′ is held in an inoperative elevated position above the ratchet 124′.

Reference to a single pawl and ratchet system at this point will serve to teach the nature and operation of both systems. The cam 98 has two lobes which are effective to operate the feed lever assembly 108 through two full strokes with each complete revolution of the cam shaft 92. This, in effect, feeds two transverse rows of tape holes, one at a time, over the reading point each time the cam shaft 92 goes through one revolution.

The feed lever assembly is urged about its feed lever shaft 114 in a clockwise direction, as viewed in FIG. 6, and the feed pawl 116 is urged about its pivot pin 118 in a counterclockwise direction, as viewed in that figure, by a spring 126 having its respective ends connected to the feed pawl 116 at a point below its pivot pin 118 and to a pin 128 extending from the inner face of the rear frame plate 130.

Associated with the feed pawl 116 is a feed pawl rest block 132 and a feed pawl stop 134. The feed pawl rest block 132 is attached to the rear frame plate 130 by means of an eccentric screw 136, while the feed pawl stop 134 is similarly attached by means of an eccentric screw 138. The eccentricity of these screws permits adjustment of the rest block 132 and stop 134, respectively, if necessary. The details of the feed pawl rest block 132 are shown in FIG. 10, while the details of the feed pawl stop 134 are best shown in FIG. 7.

The feed pawl rest block 132 (FIG. 10) consists of a block 140 which, in addition to the screw 136, also receives a locking screw 142. The position of the block 140 in reference to the travel of the feed pawl 116 may be adjusted by backing off the screw 142 and then turning the eccentric sleeve of the screw 136 until adjustment is achieved. That position can then be maintained by tightening the locking screw 142 which extends through an oblong slot 144 in the rear frame plate 130. The block 140 has mounted therein a strip of felt 146 which will buffer the contact of the head 120 of the feed pawl if contact is made and which may also be impregnated with a suitable lubricant to lubricate the head of the pawl.

The feed pawl stop assembly 134 is shown in section in FIG. 7 and also in end elevation in FIG. 6. The position of this block can also be adjusted by turning the eccentric screw 138, as in the case of screw 136, to the needs of the feed pawl 116. The block 134 has a slot 148 therein to receive the feed pawl 116 at the limit of its outward movement. The sides of the slot 148 provide lateral confinement for the feed pawl. Extending inwardly from the top and bottom of the block are slotted felt pads 150 and 152 (FIG. 6), respectively. These pads also serve to buffer the feed pawl and lubricant may also be applied thereto for transfer to the shank of the pawl, if desired.

The sides of the slot 148 of the feed pawl stop help retain the pawl in its proper orientation as it is operated. However, it should be noted that the rear face of the slot constitutes a stop surface for the pawl at the bottom of its stroke. Specifically, when the pawl 116 reaches the bottom of its stroke, there is a jamming action between the head 120 of the pawl, the ratchet teeth 122, and the pawl 116 with the back wall of the slot 148. This limits the descent of the pawl 116 and prevents the ratchet wheel from overtravelling.

When the pawl has reached the bottom of its descent and is there held from further downward movement, as described, the cam follower 102 and its cam 98 lose contact. The wedging action above described is adjusted to take place to stop the pin wheel 12 at exactly the right rotational position to present the code holes in the tape in accurate registration with the photocells of the reading head. The exact point at which the pawl, the ratchet wheel, and the rear face of the feed pawl stop interengage with each other is determined by an adjustment of the feed pawl stop 134 in relation to the pawl 116. This is achieved by turning the eccentric screw 138 to establish the jamming contact at just the right point. Preferably, the rear face of the pawl 116 and the rear face of the slot 148 are so related to each other that maximum contact is established between these faces when the feed pawl stop is properly adjusted.

When the feed pawl stop 134 is properly adjusted, care must be exercised that the detent roller 176 is correspondingly adjusted. The detent roller 176 must be firmly seated between two teeth with the ratchet in the position determined by the downward movement of the pawl at the time its descent is halted.

The pawl rest block 132 engages the head 120 of the pawl 116 and holds it away from the ratchet at the upper limit of its movement. The pawl slot and the rest block is defined in part by a lip 141 which is engaged by the pawl head 120 and serves to restrain the inward movement of the pawl at the top of its stroke.

More specifically, if the head 120′ were not held by the rest block 132′ to prevent contact between the head 120′ and its associated ratchet teeth 122′, it would not be possible for the pawl 116 and its head 120 to drive the ratchet wheel 124 in a clockwise direction as viewed in FIG. 6. It should be noted that the cams drive their associated pawls upwardly a greater distance than is necessary for a full ratchet-operating stroke of the pawl. This insures that the pawl heads are fully engaged behind the lip of the rest block and are safely out of the way of their related ratchets in case of reverse rotation. The rest block 140 is adjusted by backing off its locking screw 142 and turning its eccentric screw 136 as may be necessary to cause the pawl head 120 to properly engage the tooth 122 of its ratchet wheel 124 when driving engagement between the two is to take place.

The arm 110 (FIG. 6) of the feed lever 108 extends into operative proximity with a feed magnet assembly 154 mounted on a feed magnet block 156. The feed magnet assembly consists of a magnetic yoke 158 in which is mounted the electromagnet 160 consisting of its coil 162 and its core 164. An armature 166 extending across the core 164 is pivoted on an armature pivot 168 and is biased away from the core when the core is deenergized by a spring 170 connected between an armature extension beyond its pivot 168 and a hook attached to the feed magnet block 156. When the magnet 160 is deenergized, its armature 166 will be raised into the path of the feed lever arm 110, in a manner similar to that as shown at the right in FIG. 6 with respect to the armature 166' and the feed lever arm 110'. This results in holding cam follower 102 elevated so that it cannot follow its cam 98, and thereby renders the feed lever assembly and its feed pawl 116 incapable of rotating the tape feed ratchet 124. However, whenever the feed magnet 154 is energized and its armature 166 is attracted to the magnet core, as actually shown at the left in FIG. 6, the feed lever 108 is capable of normal movement with its cam follower 102 in contact with the cam 98, and it is urged to follow its cam by the spring 126. Under these conditions, the feed pawl 116 will rotate the ratchet wheel 124, as explained before.

It may be assumed for purpose of example that the feed magnet 154 can control the feed lever 108 to feed the tape from left to right, as viewed in FIG. 1. This follows from the fact that the pawl 116 drives the ratchet 124 and the pin wheel shaft 32 in a clockwise direction when viewed as in FIG. 6, i.e., from the same direction as in the case of FIG. 1. There is an identical feed magnet assembly 154' in control of the feed lever assembly 108' which carries the cam follower 102' into contact with the cam 98', as heretofore explained. The feed magnet assembly 154' when deenergized will render inoperative the feed lever assembly 108' in the same manner as the feed lever assembly 108 is rendered inoperative by the feed magnet assembly 154 when it is deenergized. For the purpose of this description, it may be considered that the feed magnet assembly 154' controls the feed lever assembly 108' to feed the tape from right to left, i.e., when operating it is effective to drive the pin wheel 12 in the counterclockwise or reverse direction, as viewed in FIG. 6.

The detailed explanation of the structure and operation of the feed lever assembly 108, its related cam 98, its feed pawl 116, in conjunction with the tape feed ratchet wheel 124, and the related feed pawl rest block 132 and feed pawl stop 134, makes it unnecessary, as stated, to describe in detail the structure and operation of the feed lever assembly 108' and its appurtenances because these elements, as stated, are identical in form and operation to the corresponding elements previously described with the exception that their position in respect to the pin wheel shaft is reversed.

The ratchet wheels 124 and 124' are stabilized, as stated, by the detent roller 176 which rides in contact with the teeth of the tape feed ratchet 124. This roller is carried at the end of a detent arm 178, which, as shown in FIG. 7, is comprised of a pair of plates 180 and 182 held in spaced relation by means of a spacing stud 184 and a pivot sleeve 186 (FIG. 7) at which the arm is mounted for rocking movement on an adjustable eccentric screw 188. A part of the arm 190 extends laterally of its pivot and has attached to its free end a spring 192, the other end of which is attached to a stud 194 extending outwardly from the rear frame plate 130. Only one detent is required as both ratchets are fixed to the same shaft and no matter which ratchet is being driven, both will turn. This makes it possible to stabilize the rotation of the shaft 32 by detenting only one of the ratchets.

A control circuit (no part of the present invention and, therefore, not illustrated) will be provided for the feed magnets 154 and 154' whereby both may be disabled or whereby either one may be disabled while the other is in operation. Appropriate interlocks may be provided in the feed magnet control circuit to avoid the possibility of energizing both magnets at the same time. However, even if the feed magnets 154 and 154' were simultaneously energized, the stronger of the springs 126–126' would prevail and damage to the mechanism would be avoided, or if the springs are substantially equal in strength as they are likely to be, there will be no rotation of the ratchets and again injury to the mechanism would be avoided.

With the feed magnet 154 energized and the feed magnet 154' deenergized, as shown in FIG. 6, the pin wheel shaft 32 will be driven in a clockwise direction, as shown in that figure, and the pin wheel 12 will consequently be driven to feed the tape. During this operation, the armature 166 is attracted to the core 164 of the feed magnet and thus offers no interference with the free movement of the arm 110 of the feed lever 108. Since the spring 126 draws the cam follower 102 into contact with the feed cam 98 during rotation of the latter, the feed lever 108 will be rocked upwardly about its feed lever eccentric shaft 114 each time that a high lobe of the cam comes into contact with the cam follower 102. Thus the pressure between a latched feed lever 110' and its associated armature 166' is periodically relieved during the rotation of the cam. That is, the lever 110' is slightly elevated and thereby breaks its direct contact with its latching armature 166'. Advantage is taken of this reduced pressure by selecting this moment to energize the related feed magnet, which thereby requires less power to energize it and renders its operation quieter and faster. The operation with feed lever 110 and armature 166 is similar.

The feed pawl 116 is elevated as the arm 106 of the feed lever 108 is rocked upwardly. The spring 126 effectively rotates the feed pawl 116 on its pivot 118 and holds it in contact with the tooth of the tape feed ratchet 124. As the cam continues to rotate, he pawl engages the next tooth of the ratchet wheel and the pawl head 120 rides up behind the lip 141 of the pawl rest block 132. In the meantime, the inactive pawl 116' is held out of contact with its associated ratchet wheel because its head 120' rests behind the lip 141' of its pawl rest block.

As the feed cam 98 continues to rotate and the cam follower 102 encounters a low point in the feed cam, the pawl 116 will descend, and as its head 120 is disengaged from the rest block lip 141, the spring 126 will project the head 120 of the pawl inwardly and properly engage it with a tooth of the ratchet wheel. Continued downward movement of the pawl 116 serves to advance the tape feed ratchet 124 the distance of one of its teeth, which distance is equivalent to the distance between adjacent code holes punched into the tape. Since the feed cam 98 is formed with two lobes, the tape feed ratchet 124 will be advanced the distance of two teeth, one at a time, by the tape feed ratchet during each revolution of the cam. Downward movement of the pawl 116 will continue until it is jammed at the bottom of its stroke, as explained above. This jamming action brings the feed ratchet to a complete stop without any overtravel.

If it is now desirable to change the direction of tape feed, the feed magnet 154 will be deenergized first thereby releasing its armature 166 and permitting the armature spring 170 to elevate the armature about the armature pivot 168. This interposes the armature 166 into the path of the arm 110 of the feed lever 108 and, except for the slight cyclic separation of the feed lever and armature above noted, positively holds the cam follower 102 out of operative contact with the feed cam 98. In this position, the head 120 of the feed pawl 116 will be in contact with the feed pawl rest block 132. Under these conditions, while the cam shaft 92 is still being driven, neither of the feed ratchets 124 or 124' will be operated and no tape will be fed through the tape reading station in either direction.

While the feed magnet 154 remains deenergized, the feed magnet 154' may be energized to reverse the direction of tape movement. The energizing circuits for the feed magnets may be controlled by the angular position of the shaft 92 so that they can be energized only when the feed levers are lifted free of a latching armature as above described. Attraction of the armature 166′ to the core 164′ of the feed magnet 162′ will release the feed lever 108′ for operation. When the feed magnet 154′ is energized, its armature 166′ will be attracted and thereby removed from its blocking position against the end of the arm 110′ of the feed lever 108′. When this happens, the cam follower 102′ carried by the arm 106′ of the feed lever 108′ will be held in contact with its related cam 98′ by its spring 126′ and the feed lever will be successively elevated and lowered together with the feed pawl 116′. As above intimated, the spring 126′, which is attached between the lower end of the feed pawl 116′ and the chassis pin 128′, will hold the cam folower 102′ in firm contact with the cam 98′ except when a separation occurs at the bottom of the stroke of the pawl when it is jammed against further descent. The spring 126′ also will serve to project the head 120′ of the feed pawl 116′ into contact with successive teeth of the tape feed ratchet 124′ as the feed pawl 116′ is reciprocated, thus advancing the ratchet 124′ the distance of one tooth each time the feed pawl 116′ is drawn downwardly. In this case, the cam 98′ has the same shape as the cam 98′ with the exception that its two lobes are somewhat rotationally offset in respect to the corresponding lobes of the feed cam 98. As the feed pawl 116′ is reciprocated upon the continued rocking of the feed lever 108′ about its eccentric shaft 114′, the feed pawl will ride in contact with the side walls of the slot of the feed pawl stop 134′ and be guided thereby in the lateral direction as it reciprocates.

It can be seen, therefore, that by providing a pair of oppositely disposed assemblies of identical elements, a simple way has been shown to drive the pin wheel shaft 32 in either direction at the discretion of the operator or in response to a control signal. Moreover, it is clear that a bidirectional tape drive is provided with a tape feed shaft having mounted thereon a tape driving pin wheel, that the shaft is journalled for bidirectional rotation, and that a pair of spaced tape feed ratchets mounted on the tape feed shaft for rotation thereof form, together with a pair of feed cams mounted on a rotatable driven cam shaft, pairs of aligned vertically spaced feed cam-tape feed ratchet assemblies. Moreover, it is clear that the similar feed levers which are mounted for rocking movement by each of the cams are identical in structure and that both of the feed levers have a pawl adapted to drive their respective feed ratchets in opposite rotational directions. Moreover, a very simple electro-magnetically operated latching device is provided for selectively disabling one or the other of the ratchet drive assemblies, and a simple guide keeps one pawl out of engagement with its ratchet while the other pawl is driving.

The bidirectional tape drive described herein has been specifically illustrated and described in a single embodiment for the purpose of disclosing a presently preferred form of the invention. It is intended that the particular illustrative embodiment shall not be limiting on the claims beyond the clear meaning of the language employed therein.

What is claimed is:

1. A bidirectional tape drive comprising: a tape feed shaft having a tape driving pin wheel thereon for driving engagement with a tape, said shaft being journalled for bidirectional rotation, a pair of tape feed ratchets mounted on said shaft for rotation therewith, a rotatably driven cam shaft, a pair of feed cams mounted on said cam shaft for rotation therewith, a pair of feed levers mounted for rocking movement by each of said cams, one of said feed levers having a pawl adapted to drive one of said ratchets in one rotational direction, the other of said feed levers having a pawl adapted to drive the other of said ratchets in the other rotational direction, and means for selectively disabling either or both of said levers against operation of its associated ratchet.

2. The tape drive mechanism of claim 1, wherein said selective disabling means comprises an electromagnetic latch device in the path of each of said feed levers.

3. The tape drive mechanism of claim 1, wherein said feed levers are in the form of angularly arranged arms mounted for rocking motion at their junction, one of said arms has pivoted thereto said pawl, and the other of said arms is under the influence of said selective disabling means.

4. The tape drive mechanism of claim 3, wherein said selective disabling means comprises an electromagnetic latch.

5. The tape drive mechanism of claim 1, wherein said selective disabling means comprises an electromagnet having first and second stable states and a pivoted armature, and said feed lever has an arm adapted to engage said armature in feed lever latching relation when said electromagnet is in a selected one of its stable states.

6. The tape drive mechanism of claim 1, wherein said tape feed ratchets are spaced along said tape feed shaft, and said cams are equally spaced along said cam shaft in vertically arranged ratchet and cam pairs.

7. The tape drive mechanism of claim 1, wherein said means for selectively disabling said levers comprises means for latching said levers out of contact with their respective feed cams.

8. The tape drive mechanism of claim 1, wherein each of said pawls has associated therewith an individual feed pawl rest block adapted to guide and hold the end of its associated pawl out of contact with the related ratchet wheel when the associated pawl is selectively disabled.

9. The tape drive mechanism of claim 1, wherein each of said pawls has associated therewith an individual feed pawl rest block adapted to guide and restrain said pawls from contact with their associated ratchet wheels when the associated pawl is disabled, and wherein said rest blocks are mounted in operative relation in respect to their pawls by means of a mounting device permitting adjustment thereof in reference to said pawls.

10. The tape drive mechanism of claim 1, wherein each of said pawls has associated therewith a feed pawl stop adapted to limit said pawls in their operative strokes in engagement with their respective ratchet wheels, and wherein said feed pawl stops are mounted in operative relation to their respective pawls by means of a mounting device permitting adjustment thereof in reference to said pawls.

References Cited

UNITED STATES PATENTS

| | | | |
|---|---|---|---|
| 2,933,931 | 4/1960 | Lisinski. | |
| 3,036,474 | 5/1962 | Perez. | |
| 3,181,759 | 5/1965 | Maples | 226—51 |
| 3,228,599 | 1/1966 | Haberstroh | 226—51 X |
| 3,329,325 | 7/1967 | Clark et al. | 226—51 |

ALLEN N. KNOWLES, *Primary Examiner.*

U.S. Cl. X.R.

226—84, 78, 11; 74—122